United States Patent Office 2,816,820
Patented Dec. 17, 1957

2,816,820

RECOVERY OF SODIUM SULFATE AND HYDROCHLORIC ACID FROM ACIDIC SULFATE WASTE MATERIALS

John C. Pernert, Niagara Falls, N. Y., assignor to Hooker Electrochemical Company, Niagara Falls, N. Y., a corporation of New York No Drawing. Application November 17, 1954, Serial No. 469,534

3 Claims. (Cl. 23—121)

This invention relates to the disposal of acidic sulfate waste materials and is more particularly concerned with such process which utilizes commonly available sodium salts and which prepares chemicals having economic value.

Many commercial procedures today prepare as a waste by-product an acidic sulfate material such as a mixture of sodium bisulfate containing sulfuric acid, or sulfuric acid contaminated with by-products making it unsuitable for re-use in the original process. For example, in the production of chlorine dioxide from sodium chlorate, most processes use a sulfuric acid reaction medium, which is separated from the reaction mixture containing large quantities of sodium bisulfate and other contaminants. The disposal of this material presents a serious problem, because of high acidity. Where chlorine dioxide is generated for paper pulp mills, these same pulp mills use large quantities of sodium sulfate. Even though both sodium and sulfate ions are present in the acidic sodium bisulfate waste, no economical process has heretofore been provided for the conversion of the waste acidic sodium bisulfate to prepare sodium sulfate.

It is a principal object of the present invention to provide a process for the conversion of acidic sulfate materials, including sulfuric acid and sodium bisulfate, into useful products having economic value. Another object of the present invention is to cause such conversion using readily available materials. Still a further object of the present invention is to provide such a process which involves refrigeration of aqueous solutions and separation of a crystallizate. Another object of the present invention is to provide a process for the preparation of aqueous solutions of acids. Other objects will become apparent hereinafter.

The foregoing and additional objects have been accomplished by providing an aqueous solution of an acidic sulfate and a sodium salt of an acid, cooling this solution to a temperature such that crystallization of sodium sulfate occurs, and separating the crystallizate. While the system water-sodium-hydrogen-sulfate-acid anion is normally in equilibrium, it has unexpectedly been found that by cooling the system to a temperature below about fifteen degrees centigrade, sodium sulfate will crystallize. When this crystallized sodium sulfate is removed from the system, there remains an aqueous solution of acid corresponding to the anion of the sodium salt introduced.

"Acidic sulfate" as used herein, is intended to include sulfuric acid, sodium bisulfate, trisodium hydrogen disulfate, or mixtures of any of these materials. The presence of other materials in an amount less than will cause undesirable amounts of contaminants at the temperature that the crystallizate is separated from the liquor are also included. Sodium salts of acids which are suitable are those which are soluble in water and which form a watersoluble acid, such as, for example, sodium chloride, sodium bromide, sodium iodide, sodium nitrate, sodium formate, sodium acetate, sodium propionate, sodium bromate, sodium iodate, et cetera, preferably, sodium chloride, as being the cheapest and most readily available. Of course, the particular salt which is employed will form the acid of the anion and the selection of a salt may be governed by the acid desired.

These materials are mixed in an aqueous solution desirably in an amount such that the ratio of sodium ion mole concentration is equal to two times the sulfate ion mole concentration. That is, all of the sodium and sulfate ions present can form sodium sulfate ($Na_2SO_4$). It is to be understood that other ratios such as 3.0 to 1.0 or 1.5 to 1.0 are operative, however, at the higher ratio of sodium ion, the crystallizate at lower temperatures may be contaminated with the sodium salt of the acid introduced into solution, while if an excess of sodium ion is introduced at the lower temperatures, less sodium sulfate can be crystallized causing unduly great contamination of the acid solution. Further, it is desirable that the sulfate ion concentration be rather concentrated, else on cooling, an excessive amount of ice is formed, prior to the formation of sodium sulfate. The sulfate ion mole concentration can vary from one-half mole per liter to over 2.25 moles per liter and preferably there is at least 1.25 moles per liter present. One manner of maintaining the sodium and sulfate ions in proper ratio is to approximate the amount required, incrementally cool the solution part way, remove the crystals, and, adjust the concentration of sodium or sulfate ion in the mother liquor. Then, of course, cooling the adjusted liquor will result in a material which can be cooled very low without crystallization of undesired products.

While the temperature employed will be that temperature at which an aqueous solution of acid having the desired purity is provided, for purposes of illustration, it is herein assumed that the starting solution is at room temperature and that this solution is cooled to a point to separate as much as conveniently possible of the sodium and sulfate ions. Because of the large amount of crystallizate which forms it is oftentimes more practical to remove the crystals incrementally. Thus, if desired, a starting solution may be cooled to a minus twenty ($-20$) degrees centigrade and the crystals removed. Then, the mother liquor cooled further and the newly-formed crystals are removed. Alternatively, where a relatively concentrated solution is provided, cooling to about zero (0) degrees centigrade will produce a large quantity of crystals to be removed.

The sodium sulfate will crystallize as the heptahydrate, dehydrate, or mixtures of these two materials. Conversion of the hydrates to anhydrous sodium sulfate may be accomplished in conventional manner. The solution which remains after separation of the crystals will be an acid solution having an anion corresponding to the sodium salt introduced. This acid solution, as well as the sodium sulfate, has utility in the usual applications of such materials.

In the following examples, which are given by way of illustration only, and which are not to be construed as limiting, all chloride is calculated as hydrogen chloride, and all sulfate is calculated as sodium sulfate, unless an excess of sodium is present, which is calculated as sodium chloride, while an excess of sulfate is calculated as sulfuric acid.

EXAMPLE 1

Several solutions of sodium chloride were treated with various acidic sulfates, including sodium bisulfate, sulfuric acid, et cetera, to prepare starting solutions having varying compositions. Where necessary, the solutions were heated to cause solution of all the ingredients and clarified by filtration. In each instance the solution had a volume of one liter at twenty (20) degrees centigrade. These solutions were then cooled to about minus twenty-two (−22) degrees centigrade and where super cooling occurred, crystallization induced by seeding, or by agitation. When equilibrium between the solid phase and liquid phase had been achieved, which usually meant maintaining the low temperature for several hours, the mixture was filtered, taking care to prevent warming and the mother liquor analyzed. The crystals were washed and then analyzed. For convenience, the results of several runs performed may be tabulated as follows:

COMPOSITION OF CRYSTALS (IN GRAMS)

|  | R | S | T |
|---|---|---|---|
| $Na_2SO_4$ | 17.2 | 15.1 | 31.5 |
| $H_2O$ | 42.6 | 152.0 | 187.1 |
| NaCl | 0 | 2.0 | 2.0 |
| Total | 59.8 | 169.1 | 22.6 |

COMPOSITION OF CRYSTALS

|  | R | S | T |
|---|---|---|---|
| $Na_2SO_4$ | $10 H_2O$ | $10 H_2O$ | $10 H_2O$ |
| NaCl (percent) | 0 | 1.2 | 0.9 |
| Ice (percent) | 35.0 | 78.5 | 66.7 |
| Yield (percent) | 28.0 | 32.5 | 51.3 |

*Table I*

|  | A | B | C | D | E | F | G | H | I | J | K | L | M | N | O | P | Q |
|---|---|---|---|---|---|---|---|---|---|---|---|---|---|---|---|---|---|
| Compositions of Starting Solution (grams/liter): | | | | | | | | | | | | | | | | | |
| HCl | 106.4 | 101.4 | 102.0 | 99.9 | 96.0 | 89.8 | 84.1 | 122.3 | 119.8 | 115.8 | 111.1 | 105.5 | 103.5 | 101.4 | 82.2 | 100.8 | 106.5 |
| $H_2SO_4$ | 1.5 | 0 | 10.3 | 2.5 | 2.4 | 2.3 | 2.2 | 0 | 0 | 0 | 0 | 0 | 0 | 0 | 0.6 | 0 | 0 |
| NaCl | 0 | 16.4 | 0 | 0 | 0 | 0 | 0 | 3.2 | 3.2 | 3.0 | 2.9 | 2.7 | 2.7 | 2.6 | 0 | 2.64 | 2.8 |
| $Na_2SO_4$ | 207.3 | 197.5 | 198.7 | 194.6 | 187.0 | 175.0 | 163.8 | 238.2 | 233.4 | 225.6 | 216.4 | 205.5 | 201.6 | 197.5 | 320.2 | 196.3 | 207.5 |
| $H_2O$ | 874.0 | 874.7 | 879.0 | 881.0 | 884.6 | 891.9 | 900.0 | 856.3 | 859.6 | 863.6 | 869.6 | 876.3 | 879.2 | 882.5 | 859.0 | 884.3 | 877.2 |
| Specific Gravity | 1.190 | 1.190 | 1.190 | 1.178 | 1.170 | 1.159 | 1.150 | 1.220 | 1.216 | 1.208 | 1.200 | 1.190 | 1.187 | 1.184 | 1.262 | 1.184 | 1.194 |
| Compositions of the Filtered Liquors (grams/liter): | | | | | | | | | | | | | | | | | |
| HCl | 140.7 | 135.6 | 133.4 | 127.6 | 120.3 | 118.1 | 116.6 | 159.6 | 160.4 | 157.2 | 144.3 | 138.9 | 136.8 | 131.9 | 144.3 | 133.9 | 142.9 |
| $H_2SO_4$ | 2.0 | 0 | 15.7 | 3.1 | 1.3 | 3.3 | 2.8 | 10.9 | 0 | 0 | 0 | 0 | 0 | 0 | 3.0 | 0 | 0 |
| NaCl | 0 | 19.9 | 0 | 0 | 0 | 0 | 0 | 0 | 2.9 | 2.9 | 2.4 | 3.5 | 3.5 | 2.9 | 0 | 1.6 | 1.2 |
| $Na_2SO_4$ | 63.6 | 47.8 | 58.8 | 47.6 | 53.6 | 59.3 | 64.0 | 89.0 | 106.3 | 84.4 | 89.7 | 72.3 | 66.5 | 63.2 | 80.2 | 59.5 | 67.7 |
| $H_2O$ | 903.7 | 906.7 | 902.1 | 931.7 | 927.8 | 919.3 | 919.6 | 880.5 | 877.4 | 887.5 | 895.6 | 903.2 | 910.0 | 894.5 | 908.0 | 900.2 | |
| Specific Gravity | 1.110 | 1.110 | 1.110 | 1.110 | 1.103 | 1.100 | 1.103 | 1.140 | 1.147 | 1.132 | 1.132 | 1.118 | 1.110 | 1.108 | 1.222 | 1.103 | 1.112 |
| Volume | .756 | .748 | .764 | .783 | .798 | .761 | .721 | .729 | .747 | .736 | .770 | .759 | .756 | .769 | .570 | .753 | .745 |
| Composition of Crystals (grams): | | | | | | | | | | | | | | | | | |
| $Na_2SO_4$ | 159.2 | 161.7 | 153.7 | 157.3 | 144.3 | 129.9 | 117.7 | 173.3 | 154.0 | 163.2 | 147.3 | 150.6 | 151.3 | 148.9 | 274.5 | 151.5 | 157.0 |
| $H_2O$ | 191.4 | 196.7 | 189.3 | 151.6 | 144.1 | 192.5 | 237.4 | 214.4 | 204.3 | 209.9 | 180.1 | 190.3 | 195.8 | 182.9 | 349.4 | 200.9 | 206.3 |
| NaCl | 0 | 1.5 | 0 | 0 | 0 | 0 | 0 | 9.6 | 1.0 | 0.8 | 1.1 | 0 | 0 | 0 | 0 | 0 | 1.9 |
| Total | 350.6 | 359.9 | 343.0 | 308.9 | 288.4 | 322.4 | 355.1 | 397.3 | 359.3 | 373.9 | 328.5 | 340.9 | 347.1 | 331.8 | 623.9 | 352.4 | 365.2 |
| Composition of Crystals: | | | | | | | | | | | | | | | | | |
| $Na_2SO_4(XH_2O)X=$ | 9.48 | 9.6 | 9.72 | 7.6 | 7.88 | 10.0 | 10.0 | 9.76 | 10.0 | 10.0 | 9.65 | 9.97 | 10.0 | 9.69 | 10.0 | 10.0 | 10.0 |
| NaCl (percent) |  | 0.4 |  |  |  |  |  | 2.5 | 0.28 | 0.2 | 0.3 |  |  |  |  |  | 0.5 |
| Ice (percent) |  |  |  |  | 8.6 | 24.8 |  | 2.5 | 1.0 |  |  | 1.2 |  | 0.02 | 2.5 | 2.0 | |
| Yield (percent) | 76.8 | 81.9 | 77.3 | 80.9 | 77.1 | 74.2 | 71.8 | 72.8 | 66.0 | 72.3 | 68.1 | 73.3 | 75.1 | 75.4 | 85.7 | 77.2 | 75.66 |

EXAMPLE 2

Several of the filtered liquors of the above Example were combined to yield two portions containing one liter each of solution having the composition shown at R and T in the following Table II. One portion was cooled by stirring with a test tube filled with solid carbon dioxide to minus thirty-one (−31) degrees centigrade, the crystallizate separated by filtration taking care to avoid warming of the mixture, and the mother liquor analyzed. Thereafter, this mother liquor, having the composition shown at R was cooled to minus forty (−40) degrees centigrade and the crystallizate separated again, taking care to prevent warming of the mixture. The results of this second separation are shown at S. The second portion of combined filtered liquors was cooled directly to minus forty (−40) degrees centigrade by stirring with a test tube containing solid carbon dioxide and the crystallizate separated as above. The results of this separation are shown in the following table at T.

*Table II*

COMPOSITION OF STARTING SOLUTION (GRAMS/LITER)

|  | R | S | T |
|---|---|---|---|
| HCl | 135.2 | 142.1 | 135.2 |
| $H_2SO_4$ | 0 | 0 | 0 |
| NaCl | 0 | 0 | 0 |
| $Na_2SO_4$ | 61.4 | 46.5 | 61.4 |
| $H_2O$ | 908.4 | 910.4 | 908.4 |
| Specific Gravity | 1.105 | 1.099 | 1.105 |

COMPOSITION OF FILTERED LIQUORS (GRAMS/LITER)

|  | R | S | T |
|---|---|---|---|
| Temperature Degrees C | −31 | −40 | −40 |
| HCl | 142.1 | 165.0 | 166.2 |
| $H_2SO_4$ | 0 | 2.0 | 2.0 |
| NaCl | 0 | 0 | .0 |
| $Na_2SO_4$ | 46.5 | 37.0 | 37.1 |
| $H_2O$ | 910.4 | 895.0 | 894.7 |
| Specific Gravity | 1.099 | 1.100 | 1.100 |
| Volume (liters) | .951 | .855 | .806 |

In the manner of the foregoing Examples, other sodium salts, such as sodium iodate, sodium bromate, sodium nitrate, et cetera, will produce aqueous solutions of the corresponding acids and sodium sulfate.

Various modifications may be made in the method of the present invention without departing from the spirit or scope thereof and it is to be understood that I limit myself only as defined in the appended claims.

I claim:

1. A process for the conversion of wastes containing primarily acidic sulfates which comprises: providing an aqueous solution containing sulfate, chloride, hydrogen and sodium ions, the ratio of sodium to sulfate ions being between 3.0 and 1.5 to 1.0, and the sulfate ion is present in an amount of from 0.5 to about 2.25 moles per liter, cooling the solution to below minus fifteen degrees centigrade, and separating the crystals which form thereby to provide an aqueous solution of hydrochloric acid.

2. The process for the conversion of wastes containing primarily acidic sulfates which comprises: providing an aqueous solution containing sulfate, chloride, hydrogen and sodium ions, the ratio of sodium ions to sulfate ions being approximately 2 to 1, and the sulfate being present in an amount of from about 1.25 to about 2.25 moles per liter of solution, cooling this solution to a temperature below minus twenty (−20) degrees centigrade, and, separating the sodium sulfate crystals thus-formed thereby to provide an aqueous solution of hydrochloric acid.

3. A process for the conversion of wastes containing primarily acidic sulfates which comprises: providing an aqueous solution containing sulfate, chloride, hydrogen and sodium ions, the ratio of sodium ions to sulfate ions being approximately 2 to 1, and the sulfate being present in an amount of from about 1.25 to about 2.25 moles per liter of solution, cooling this solution to a temperature of approximately minus twenty (−20) degrees centigrade, separating the crystals which form, adjusting the sodium and sulfate ion concentration to about 2.0 to 1.0, cooling the liquid remaining to minus forty (—40) degrees centigrade, and separating the crystals thus-formed thereby to provide an aqueous solution of hydrochloric acid.

References Cited in the file of this patent

UNITED STATES PATENTS

| | | |
|---|---|---|
| 1,863,172 | Stockly et al. | June 14, 1932 |
| 1,958,760 | Martin | May 15, 1934 |
| 1,971,754 | Martin | Aug. 28, 1934 |
| 2,275,825 | Lewis | Mar. 10, 1942 |

FOREIGN PATENTS

| | | |
|---|---|---|
| 105,071 | Australia | Sept. 15, 1938 |
| 127,677 | Great Britain | June 12, 1919 |

OTHER REFERENCES

Mellor: "Comprehensive Treatise on Inorganic and Theoretical Chemistry," Longmans, Green and Co., New York, 1922, vol. 2, pages 667, 678–682, 657.

Smith: "Inorganic Chemistry," Appleton Century Co., New York, 1937, pages 206, 207, 208.

U. S. DEPARTMENT OF COMMERCE

PATENT OFFICE

CERTIFICATE OF CORRECTION

Patent No. 2,816,820                                December 17, 1957

John C. Pernert

It is hereby certified that error appears in the printed specification of the above numbered patent requiring correction and that the said Letters Patent should read as corrected below.

Column 2, line 50, for "dehydrate" read --decahydrate--;

Signed and sealed this 25th day of February 1958.

(SEAL)
Attest:
KARL H. AXLINE

Attesting Officer

ROBERT C. WATSON
Commissioner of Patents